United States Patent [19]

Hurst

[11] Patent Number: 4,693,874

[45] Date of Patent: Sep. 15, 1987

[54] METHOD FOR REDUCING GAS TURBINE $NO_x$ EMISSIONS

[76] Inventor: Boyd E. Hurst, 21 Wherli Rd., Long Valley, N.J. 07853

[21] Appl. No.: 715,168

[22] Filed: Mar. 22, 1985

[51] Int. Cl.$^4$ .......................... C01B 21/00; B01J 8/00
[52] U.S. Cl. ..................................... 423/235; 423/239
[58] Field of Search ..................... 423/235, 235D, 239, 423/239 A

[56] References Cited

U.S. PATENT DOCUMENTS

| | | | |
|---|---|---|---|
| 3,900,554 | 8/1975 | Lyon | 423/235 |
| 4,129,651 | 12/1978 | Koike et al. | 423/235 |
| 4,423,017 | 12/1983 | Dean | 423/235 |
| 4,473,536 | 9/1984 | Carberg et al. | 423/239 |
| 4,473,537 | 9/1984 | Ford et al. | 423/239 |
| 4,507,269 | 3/1985 | Dean et al. | 423/235 |

FOREIGN PATENT DOCUMENTS 60-014926  1/1985  Japan .

OTHER PUBLICATIONS

Exxon Thermal DeNO$_x$ Process for a Stationary Combusion Sources, May 25, 1982, 13 pages.
Combustion and Flames, C. P. Fenimore, 245–250 (1980).
"Proceedings of the American Flame Research Committee", International Symposium on Alternative Fuels and Hazardous Wastes (1984), 1.6.1–1.6.25.
U.S. Air Force Report AFAPL-TR-72-80, "Fuel Modification for Abatement of Aircraft Turbine Engine Oxides of Nitrogen Emissions (10/72), Henry Shaw.

Primary Examiner—Gregory A. Heller

[57] ABSTRACT

Disclosed is a process for non-catalytically removing $NO_x$ from combustion effluent streams at temperatures of about 1100° K. to 1500° K. and at superatmospheric pressure by injecting ammonia directly into a contacting zone where the combustion effluent has a residence time of above 2 milliseconds.

16 Claims, 6 Drawing Figures

METHOD FOR REDUCING GAS TURBINE NO$_x$ EMISSIONS

FIELD OF THE INVENTION

The present invention relates to a noncatalytic method for reducing the concentration of NO in combustion effluents by the injection of ammonia. More particularly, the invention relates to the injection of ammonia into an isothermal or cooling zone of a post combustion gas turbine apparatus where the combustion effluent is at a temperature of about 1100° to 1500° K.

BACKGROUND OF THE INVENTION

Combustion effluents and waste products from various installations are a major source of air pollution when discharged into the atmosphere. A particularly troublesome pollutant found in many combustion effluent streams is nitrogen oxide, designated as NO$_x$ to collectively indicate the presence of more than one oxide, a major irritant in smog. Furthermore, it is believed that the principal oxide, NO$_2$, undergoes a series of reactions known as photo-chemical smog formation, in the presence of sunlight and hydrocarbons. The major source of NO$_2$ is NO, which to a large degree, is generated at such stationary installations as gas and oil-fired steam boilers for electric power plants, process heaters, incinerators, coal fired utility boilers, glass furnaces, cement kilns, oil field steam generators, and gas turbines.

Heretofore, attempts at achieving NO$_x$ reduction in gas turbines via NH$_3$ injection have failed due to the generally correct assessment that conditions very unfavorable to significant NO$_x$ reduction exist within the combustor. Namely that there are higher than optimum temperatures and very low residence times.

Thermal DeNO$_x$ technology developed at Exxon Research and Engineering teaches a method of NO$_x$ control which appears to be generally applicable to gas turbines. U.S. Pat. No. 3,900,554 to Richard K. Lyon teaches that substantial NO$_x$ reduction can be achieved in the 1600° F. to 2000° F. temperature range and in the presence of excess oxygen via NH$_3$ injection. Temperatures within this range do indeed exist within the gas turbine. However, another important ingredient which is key to significant DeNO$_x$ performance in gas turbines is residence time. The above-stated patent describes a broad range of applicable residence times from 0.001 to 10 seconds, both the examples only use a 75 millisecond or above residence time carried out at 1 atmosphere pressure. Typically, residence times within the gas turbine combustor are approximately 20-30 milliseconds which is far too low to achieve required NO$_x$ reductions at atmospheric pressure.

In U.S. Air Force report AFAPL-TR-72-80 entitled "Fuel Modification for Abatement of Aircraft Turbine Engine Oxides of Nitrogen Emissions" (October, 1972) fuel additives including ammonia-water and ammonia-water-methanol were used in aircraft turbine engines operating at pressures of about 45-60 psig. The results reported showed only slight NO$_x$ reductions.

In a paper entitled "Exxon Thermal DeNO$_x$ Process for Stationary Combustion Sources" delivered May 25, 1982, the present inventor disclosed plots of ammonia and NO$_x$ concentration for utility boilers. However, the data presented does not disclose operations at superatmospheric pressure.

Adding a considerable excess of ammonia to reduce the NO$_x$ in the relatively short residence time in the turbine combustor is not desirable, since this would, to some extent, result in NO$_x$ emissions to the atmosphere being replaced by NH$_3$ emissions. In addition, since NH$_3$ may be oxidized to produce NO under certain conditions, injection of a large excess of NH$_3$ into the gas turbine combustor may not result in a significant decrease in NO$_x$ emissions.

The limitation of thermal DeNO$_x$ technology as applied to gas turbines has been analyzed by C. P. Fenimore in "Combustion and Flames" Volume 37: pages 245-250 (1980). As presented by Fenimore, the NO reduction reaction by NH$_3$ is strongly influenced by the [OH] concentration. Thus, one can increase the rate of NO reduction by increasing [OH] concentration. Unfortunately, however, increasing [OH] causes a disproportionate increase in the rate of the NH$_3$+OH→NO reaction. Thus, any effort to improve the rate of NO reduction inevitably ruins the selectivity of the reaction and one is trapped in a situation in which NH$_3$ either reacts with good selectivity but too slowly, or it reacts fast enough but with poor selectivity, so that the net reduction of NO is poor. The effects of this conclusion were demonstrated by Fenimore based on lab tests conducted at conditions typical of gas turbine combustors but at atmospheric pressure.

In the "Proceedings of the American Flame Research Committee" 1984 International Symposium on Alternative Fuels and Hazardous Wastes, P.C.T. de Boer developed an extended NO$_x$ reaction model and used the model to assess the potential for DeNO$_x$ is a gas turbine combustor. DeBoer concluded that the residence time in the combustor was not sufficient to produce a low level of NO$_x$ in the gas turbine emissions.

In addition, H$_2$O concentration in the flue gas plays a major role in the DeNO$_x$ reaction via NH$_3$ injection. This is illustrated by FIG. 1 where increasing H$_2$O concentration has a significant inhibiting effect on DeNO$_x$ performance. Frequently, water or steam is injected into combustors, particularly gas turbine combustors, to lower the peak exhaust gas temperature and the NO$_x$ content of the combustion effluent. Thus, one would conclude that H$_2$O injection into gas turbine combustors for NO$_x$ reduction is somewhat incompatible with simultaneous NH$_3$ injection.

The analysis of model gas turbine systems to date has generally been based on laboratory DeNO$_x$ data taken at or near the specific temperature and residence time conditions within the combustor without considering elevated pressure. However, recently there has been developed a kinetic model utilizing the basic mechanism of NO$_x$ reduction via NH$_3$ injection considering both chemistry and physical properties including pressure. This model has been validated at atmospheric pressure with an extensive bank of experiments and at elevated pressure by limited experiments. Thus, it is now possible to conduct analyses via computer calculations without the need to perform specific experiments.

Use of this kinetic model has led to the surprising discovery that at conditions normally existing at the exit of the combustor, significant DeNO$_x$ can be achieved. At high pressures common to gas turbine combustors of 10-15 atmospheres, the thermal DeNO$_x$ reaction is positively and significantly affected even at relatively low residence times. Since the kinetic model calculations represent a performance limit, calculations have also been performed via a 2-dimensional turbulent flow model combined with the kinetic model to take into account the effects of mixing and temperature profiles in the combustor. These calculations confirm that significant DeNO$_x$ can be achieved through this invention.

SUMMARY OF THE INVENTION

The present invention is directed to a process for noncatalytically reducing the concentration of combustion effluent, preferably a gas turbine combustion effluent containing NO under oxidizing conditions at temperatures below about 1500° K. by injecting ammonia into the combustion effluent in an isothermal or cooling zone wherein the combustion effluent has a residence time of at least 2 milliseconds and wherein an effective amount of ammonia is used so that the concentration of NO is reduced.

By this invention there is provided a process for reducing NO concentration in a gas turbine combustion effluent containing at least 0.1 volume percent O$_2$ comprising the step of contacting said effluent with ammonia under isothermal or cooling conditions at a temperature in the range of about 1100° K. to 1500° K. and superatmospheric pressure, said contacting being carried out at a residence time of above 2 to about 75 milliseconds such that a reduction of NO in the combustion effluent is realized which is greater than that achieved by carrying out the process under substantially similar conditions but at atmospheric pressure.

The present invention also is directed at a process for reducing the NO$_x$ concentration in the combustion effluent of a gas turbine where the combustion effluent comprises at least 0.1 volume percent O$_2$. The process comprises the step of contacting the effluent with ammonia at a temperature ranging between about 1100° K. and about 1500° K. at superatmospheric pressure. The contacting is carried out in a contacting zone having a residence time greater than 2 milliseconds to thereby reduce the NO$_x$ concentration in the combustion effluent. The superatmospheric pressure in the contacting zone may range between above 1 and about 100 atmospheres, preferably between about 10 and about 100 atmospheres. The residence time in the contacting zone after ammonia addition ranges from above 2 milliseconds to about 75 milliseconds, generally from above 2 milliseconds to about 30 milliseconds, preferably from about 20 to about 30 milliseconds. Water or steam may be added to cool the combustion effluent. Ammonia may be added to the contacting zone with a carrier gas to promote good intermixing of the ammonia with the combustion effluent. The mole ratio of ammonia added to the contacting zone to the NO$_x$ entering the contacting zone may range between about 10:1 and about 0.5:1, preferably between about 3:1 and about 1:1.

The present invention also is directed at a method for reducing the NO$_x$ concentration of a gas turbine effluent in a contacting zone where the combustion effluent comprises at least 0.1 volume percent O$_2$, at a temperature ranging between about 1100° K. and about 1500° K., and at superatmospheric pressure where the combustion effluent has a residence time greater than 2 milliseconds in the contacting zone, which process comprises injecting ammonia in an amount and at a location determined by the solution of a set of simultaneous equations derived from the kinetic model of Table I hereinafter.

DETAILED DESCRIPTION OF THE INVENTION

Figure 1:
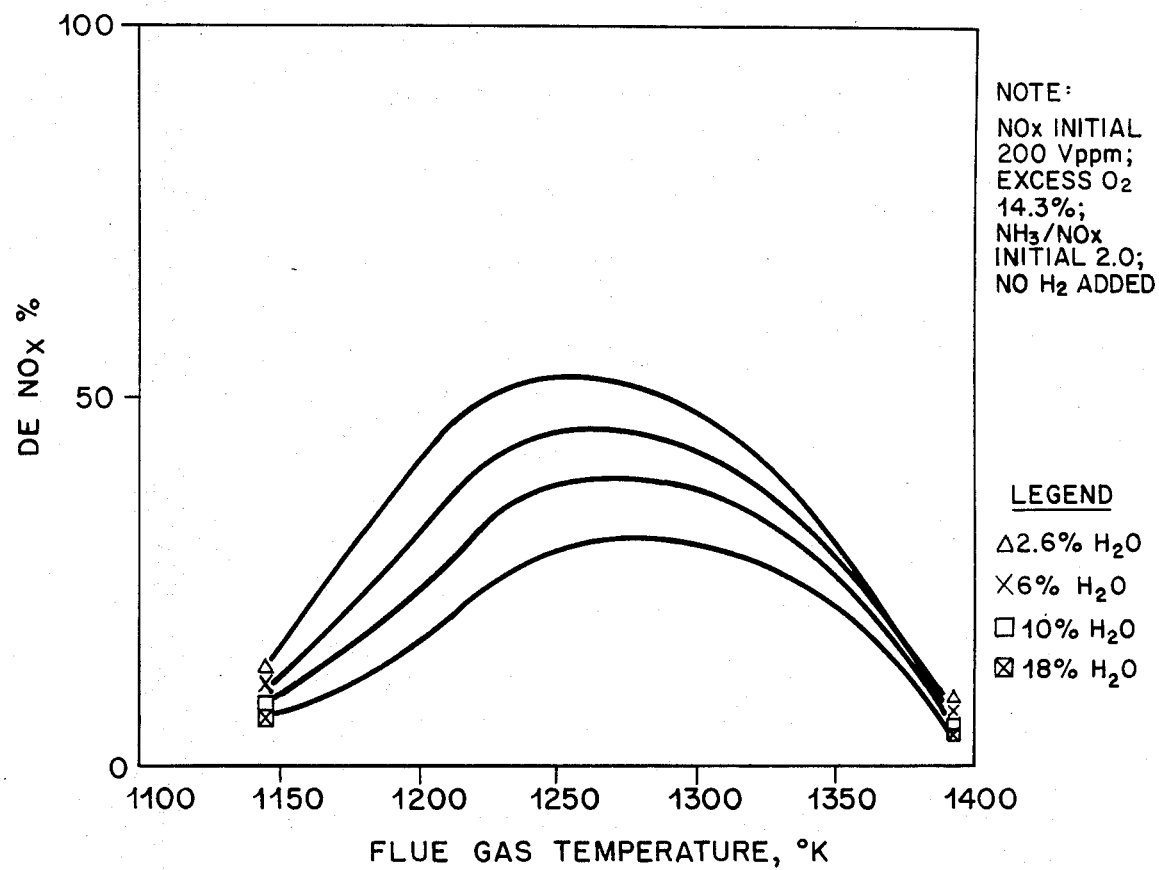
FIG. 1 is a plot of % NO$_x$ reduction in a gas turbine vs. flue gas temperature in °K. at a residence time of 0.02 seconds and 1.0 atmosphere at four different levels of water concentration as calculated from a kinetic model.

As is well-known, combustion in a gas turbine is effected in a section of the equipment commonly referred to as a combustor. Generally, this is accomplished by igniting a suitable fuel, in the presence of air, in one or more combustors simultaneously. The principal combustion products are carbon dioxide and steam. These products, along with the other combustion products, such as carbon monoxide and the various oxides of nitrogen and sulfur, combined with any excess oxygen and unconverted nitrogen, form what is referred to herein as a combustion effluent. The combustion effluent normally will contain about 0.1 to 16 volume percent oxygen.

The temperature of the combustion effluent typically is a maximum at or near the point of combustion and decreases axially (along the flow path) and radially (outwardly) as the effluent moves along its flow path from the point of combustion until it is, ultimately, emitted to the atmosphere or otherwise loses its identity as a combustion effluent. The combustion effluent, passing through the combustion apparatus remains substantially isothermal in temperature after leaving the combustion zone in a gas tubine engine until it contacts the fan blade section, where it undergoes rapid cooling. The prior art suggests that the desired NO$_x$ reduction will not be possible in the gas turbine engine because of the relatively short residence times and high temperatures. However, by practice of the present invention, significant NO$_x$ reduction can be achieved at high temperatures immediately before and in a cooling zone.

The amount of ammonia used herein ranges from about 0.5 to 10 moles, preferably about 1 to about 3 moles of ammonia, per mole of NO$_x$ to be removed.

The reaction is carried out at pressures above 1 atmosphere to about 100 atmospheres, preferably 10–100 atm. The point of injection of ammonia as well as the mixing of the ammonia in the post-combustion zone are regulated so that there is an effective residence time of about 0.002 to about 0.075 seconds, preferably from about 20–30 milliseconds at a temperature ranging from about 1100° K. to about 1500° K., to enable the ammonia to remove NO$_x$ from the combustion effluent stream. As discussed more fully hereinafter the ammonia preferably is injected at the point at which the temperature is calculated to afford the greatest reduction in NO$_x$.

Although at temperatures in the range of about 1100°–1500° K. and short residence times it has been suggested that conventional non-catalytic DeNO$_x$ processes would be generally inoperative, the inventor hereof has identified a critical set of conditions whereby DeNO$_x$ may now be practiced on a combustion effluent in a gas turbine. Furthermore, the practice of the present invention enables a more effective non-catalytic DeNO$_x$ operation at very short residence times down to about 2 milliseconds.

Because it is difficult to accurately simulate, on a laboratory scale, the temperature-time history of combustion effluents as they pass through a gas turbine, it is necessary to generate examples by means other than laboratory experiments. Complex chemical reactions occur by a series of elementary reaction steps, and if one knows the rate constants for such steps, a theoretical kinetic mechanism can be developed and verified through comparison with experimental data. An extensive block of kinetic data previously was developed by use of apparatus similar to the apparatus taught in U.S. Pat. No. 3,900,554 and used to determine which elementary reactions would likely be of significance during the reduction of NO by NH$_3$. For many of the reactions, the rate constants were well-known, accurately measured constants of nature. For the remaining reactions, the rate constants were not accurately known and, accordingly, were taken as adjustable parameters, i.e. values for the unknown rate constants were assumed, the reaction kinetics to be expected from these rate constants were calculated and compared with the observed kinetics. Based on this comparison, a new set of rate constants were assumed, etc., until satisfactory agreement between calculation and experimentation were finally obtained. The rate constants for each reaction are set forth in Table I. These rate constants do not contain pressure-related variables. The kinetic model hereof and respective rate constants were analyzed in a new approach by the inventor hereof from the standpoint of high pressure and short residence times for accurately predicting the conditions for the practice of the present invention.

TABLE I

KINETIC MODEL
Rate constant K = AT$^n$ exp [−E/(1.98)T]
M = Any Other Compound

| REACTION | A | n | E |
|---|---|---|---|
| 1. NH$_3$+O=NH$_2$+H$_2$ | .246E+14 | 0.0 | 17071. |
| 2. NH$_3$+O=NH$_2$+OH | .150E+13 | 0.0 | 6040. |
| 3. NH$_3$+OH=NH$_2$+H$_2$O | .326E+13 | 0.0 | 2120. |
| 4. HNO+M=NO+H+M | .186E+17 | 0.0 | 48680. |
| 5. HNO+OH=NO+H$_2$O | .360E+14 | 0.0 | 0. |
| 6. NH$_2$+HNO=NH$_3$+NO | .175E+15 | 0.0 | 1000. |
| 7. NH$_2$+NO=NNH+OH | .610E+20 | −2.46 | 1866. |
| 8. NH$_2$+O$_2$=HNO+OH | .510E+14 | 0.0 | 30000. |
| 9. NNH+NH$_2$=N$_2$+NH$_3$ | .100E+14 | 0.0 | 0. |
| 10. NH$_2$+O=NH+OH | .170E+14 | 0.0 | 1000. |
| 11. NH$_2$+OH=NH+H$_2$O | .549E+11 | 0.68 | 1290. |
| 12. NH$_2$+H=NH+H$_2$ | .500E+12 | 0.5 | 2000. |
| 13. NH+O$_2$=NHO+O | .300E+14 | 0.0 | 3400. |
| 14. H$_2$+OH=H$_2$O+H | .220E+14 | 0.0 | 5150. |
| 15. H+O$_2$=OH+O | .220E+15 | 0.0 | 16800. |
| 16. O+H$_2$=OH+OH | .180E+11 | 1.0 | 8900. |
| 17. H+HO$_2$=OH+OH | .180E+11 | 0.0 | 1900. |
| 18. O+HO$_2$=O$_2$+OH | .250E+15 | 0.0 | 1000. |
| 19. OH+HO$_2$=H$_2$O+O$_2$ | .480E+15 | 0.0 | 1000. |
| 20. OH+OH=O+H$_2$O | .500E+14 | 0.0 | 1090. |
| 21. HO$_2$+NO=NO$_2$+OH | .630E+13 | 0.0 | −260. |
| 22. H+NO$_2$=NO+OH | .350E+15 | 0.0 | 1500. |
| 23. O+NO$_2$=NO+O$_2$ | .100E+14 | 0.0 | 600. |
| 24. H+O$_2$+M=HO$_2$+M H$_2$O/21** | .150E+16 | 0.0 | −995. |

TABLE I-continued

KINETIC MODEL
Rate constant K = AT$^n$ exp [−E/(1.98)T]
M = Any Other Compound

| REACTION | A | n | E |
|---|---|---|---|
| 25. NNH+M=N$_2$+H+M | .200E+15 | 0.0 | 30000. |
| 26. NO$_2$+M=NO+O+M | .110E+17 | 0.0 | 66000. |
| 27. NH$_3$+M=NH+H+M | .480E+17 | 0.0 | 93929. |
| 28. O+O+M=O$_2$+M | .138E+19 | −1.0 | 340. |
| 29. NH$_3$+NO=N$_2$+H$_2$O | .910E+20 | −2.46 | 1866. |
| 30. NNH+OH=N$_2$+H$_2$O | .300E+14 | 0.0 | 0. |
| 31. NNH+NO=N$_2$+HNO | .906E+12 | 0.0 | 0. |

**i.e., A=21 × .15E+16 for H$_2$O as "third body". The "third body" may be any other constituent present.

In the practice of the present invention the content of NO, O$_2$, H$_2$O in the effluent stream to be treated is measured or estimated. These initial conditions, as well as measurements or estimates of temperatures in the range of about 1100° K. to about 1500° K. at superatmospheric pressures are used in conjunction with the kinetic model hereof with appropriate software to determine the amount of ammonia and an injection point which will give the desired NO reduction. Appropriate software suitable for use herein would be any computer program designed for numerical integration of chemical rate expressions. A non-limiting example of such software is CHEMKIN; A General-Purpose, Problem-Independent, Transportable, Fortran Chemical Kinetics Code Package; R. J. Kee, J. A. Miller, and T. H. Jefferson, an unlimited released Sandia National Laboratory Report SAND80-8003 (1980). This report is also available through the National Technical Information Service, U.S. Department of Commerce.

The advantages of the kinetic computer model hereof are substantial in that it permits one skilled in the art to readily determine, by calculation, the embodiment of the present invention which will yield optimum results for the particular circumstances. In general, however, it may be said that the present invention is an improved method of noncatalytic reduction of NO with NH$_3$. The improvement of the present invention relates to the temperature, residence time and pressure at which the NH$_3$ is contacted with the NO containing combustion effluents. This contacting is done in the combustion zone at temperatures from about 1100° K. to about 1500° K., and where enough ammonia is present such that the volume ratio of ammonia to NO is in the range of about 0.4 to 10. Generally, the ammonia can be injected up to 0.04 seconds upstream from a cooling zone, depending upon the combustion effluent temperature. The upper portion of the 1100° K. to 1500° K. temperature range relates to higher initial NO concentrations, lower O$_2$ content of the combustion effluents, higher cooling rates and shorter delay times prior to cooling. To a somewhat lesser degree, the upper portion of the temperature range is also associated with higher H$_2$O content.

As used herein the term "contacting zone" refers to that portion of the turbine in which the ammonia injected and the NO$_x$ present in the combustion effluent may interact. Where ammonia is injected into the combustion zone, the contacting zone will comprise the entire blade section and that portion of the combustion section in which the ammonia is present.

Example of Use of Kinetic Model

To illustrate the practice of the present invention and its advantages over the prior art the paper example below is presented.

For illustration, a gas turbine engine is assumed with the following operating conditions, which can be considered normal for such engines: An excess air level of 235% of stoichiometric air while firing a fuel gas of H to C mol ratio of 4.0. The boiler thus produces a flue gas containing 14.3% $O_2$, 3.03% $CO_2$, 6.06% $H_2O$ and 76.64% $N_2$. There will also be traces of NO, the exact amount depending on the nitrogen content of the fuel and the manner in which the fuel is burned. For this example the NO level will be assumed to be 200 vppm, the pressure 13.6 atmospheres, the residence time 0.005 seconds prior to cooling, and the time in the cooling zone 0.006 seconds. Further, it is assumed there will be a trace of the free radicals OH and O, the exact concentrations of these being determined by thermodynamic equilibrium and, therefore, being a function of temperature.

Combustion flue gas would exit the combustors at a very high temperature and would be cooled with secondary air as it passes to the fan section. In this example it is assumed that the gas turbine has an isothermal zone between the last entry of dilution air in the combustor and the entry into the blade section wherein the temperature is approximately 1379° K., the residence time of the flue gas within this cavity being 0.005 seconds, and the amount of ammonia injected is 400 vppm. The resulting $NO_x$ reduction under these conditions is 56% as calculated from the kinetic model.

By comparison, following the teachings of U.S. Pat. Nos. 3,900,554 and 4,115,515, at one atmosphere, one would inject $NH_3$ as the flue gas enters the isothermal zone upstream of the blades. Assuming the amount of $NH_3$ injection, the amount of NO in the flue gas, and the time/temperature relationship of the flue gas is the same as in the previous case, the resulting model calculations for $NO_x$ reduction under these conditions is only 31.1%.

Figure 2:
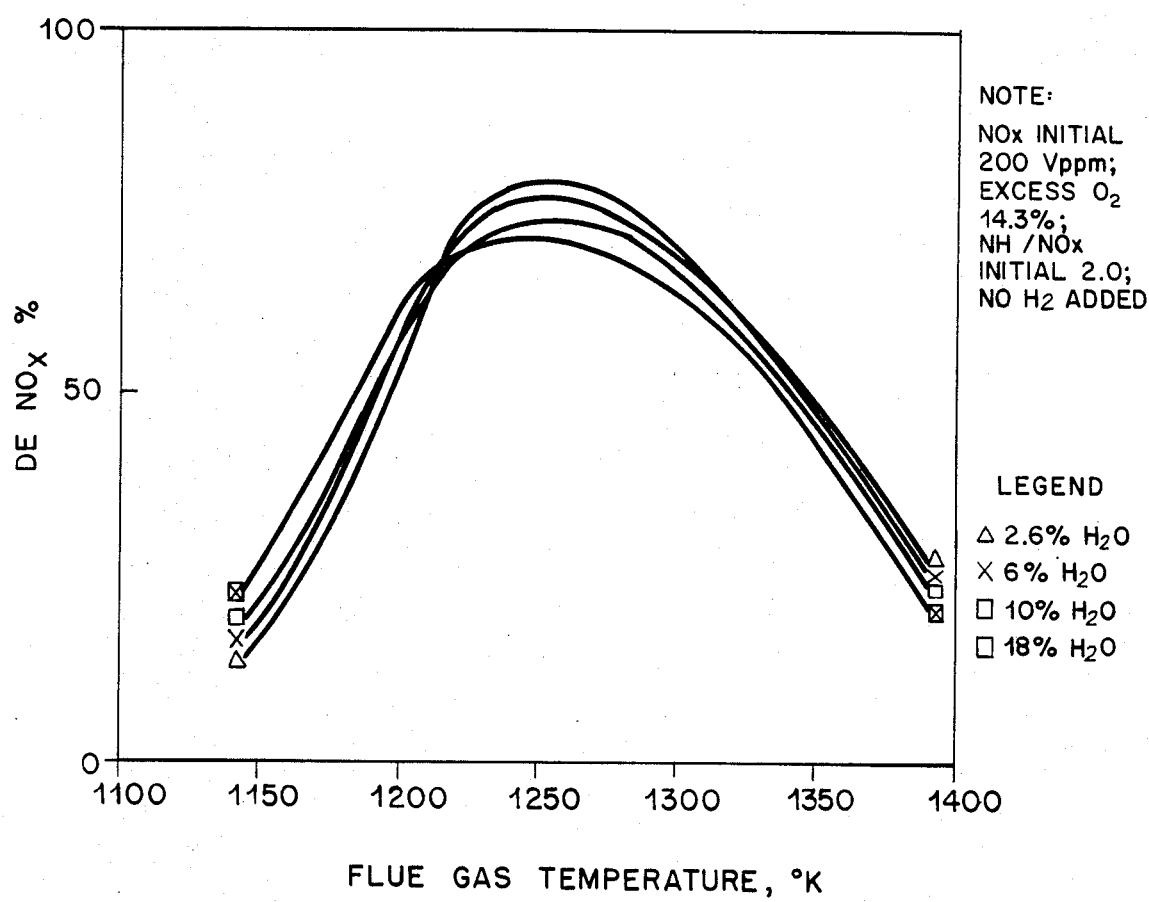
FIG. 2 is a plot of the same variables described in FIG. 1 except that the calculations were carried out at 13.6 atmospheres.

In order to graphically illustrate this invention and the effects of pressure upon the calculated level of $NO_x$ reduction, FIGS. 1 and 2 present the results of two separate sets of calculations. Both series of calculations were run assuming a constant flue gas temperature for the entire 0.02 second residence time, with varying flue gas water contents. One series of calculations presented in Table II and FIG. 1 were run for ammonia contacting at atmospheric pressure. A second set of calculations presented in Table III and FIG. 2 were run for ammonia contacting at 13.6 atmospheres. All other conditions are identical. It should be noted that at the 20 ms residence time chosen for this illustration, about a 100% $DeNO_x$ improvement is achieved at the higher pressure. Also, it should be noted from the figures that increasing water content in the flue gas is very detrimental at one atmosphere pressure, but has minimal effect at higher pressure. This discovery suggests injection of $H_2O$, which may be utilized to decrease temperature peaks and $NO_x$ content of the combustion effluent, in combination with the injection of $NH_3$ at the exit of the combustor achieves very high $NO_x$ reductions in the typical gas turbine.

TABLE II $DeNO_x$ PERFORMANCE VS. TEMPERATURE AT 1.0 ATMOSPHERE

Flue Gas Conditions for This Calculation:
Pressure - 1.0 atmospheres
Residence time - 0.020 sec.
Initial $NO_x$ Concentration - 200 vppm
$NH_3/NO_x$ (mole ratio) - 2.0
Excess $O_2$ Concentration - 14.3%
$H_2O$ Concentration - 2.6%, 6%, 10%, 18%

| Flue Gas Temperature, °K. | % $NO_x$ Reduction $H_2O$ Content in Flue Gas, % | | | |
|---|---|---|---|---|
| | 2.6 | 6 | 10 | 18 |
| 1144 | 13.6 | 10.3 | 8.1 | 6.0 |
| 1172 | 28.1 | 20.9 | 15.7 | 11.1 |
| 1200 | 41.4 | 32.2 | 24.7 | 17.3 |
| 1227 | 51.0 | 42.1 | 34.3 | 25.4 |
| 1255 | 52.9 | 45.3 | 38.2 | 29.6 |
| 1283 | 50.8 | 44.5 | 38.5 | 30.7 |
| 1311 | 45.3 | 40.5 | 35.8 | 29.2 |
| 1339 | 35.7 | 32.9 | 29.6 | 24.7 |
| 1366 | 21.6 | 20.8 | 19.2 | 16.4 |
| 1394 | 4.0 | 4.2 | 4.0 | 3.1 |

TABLE III $DeNO_x$ PERFORMANCE VS. TEMPERATURE AT 13.6 ATMOSPHERES

Flue Gas Conditions for This Calculation:
Pressure - 13.6 atmospheres
Residence time - 0.020 sec.
$NO_x$ Concentration - 200 vppm
$NH_3/NO_x$ (mole ratio) - 2.0
Excess $O_2$ Concentration - 14.3%
$H_2O$ Concentration - 2.6%, 6%, 10%, 18%

| Flue Gas Temperature, °K. | % $NO_x$ Reduction $H_2O$ Content in Flue Gas, % | | | |
|---|---|---|---|---|
| | 2.6 | 6 | 10 | 18 |
| 1144 | 13.7 | 15.7 | 17.9 | 22.2 |
| 1172 | 29.6 | 32.1 | 35.3 | 41.4 |
| 1200 | 57.2 | 57.7 | 58.8 | 60.8 |
| 1227 | 77.5 | 74.6 | 72.4 | 70.6 |
| 1255 | 80.3 | 77.3 | 74.7 | 71.4 |
| 1283 | 75.9 | 73.7 | 71.5 | 68.2 |
| 1311 | 66.7 | 65.7 | 64.1 | 61.2 |
| 1339 | 54.1 | 53.8 | 52.9 | 50.6 |
| 1366 | 40.4 | 39.4 | 38.4 | 36.3 |
| 1394 | 25.6 | 24.7 | 23.3 | 20.4 |

As shown in Tables II and III and in FIGS. 1 and 2, higher operating pressure produces the higher $NO_x$ reduction. The effect of increased $H_2O$ concentration is to lower the maximum achievable $deNO_x$ only slightly.

As previously noted, the amount of ammonia added is a function, in part, of the ammonia breakthrough, i.e., maximum amount of ammonia which is allowed to be present in the exhaust gas from the turbine. While generally there are no regulations governing the maximum ammonia content of the turbine exit gas, from an operations and regulatory standpoint it is preferred to maintain the $NH_3$ breakthrough below about 100 vppm, preferably in the 50-100 vppm range.

Figure 3:
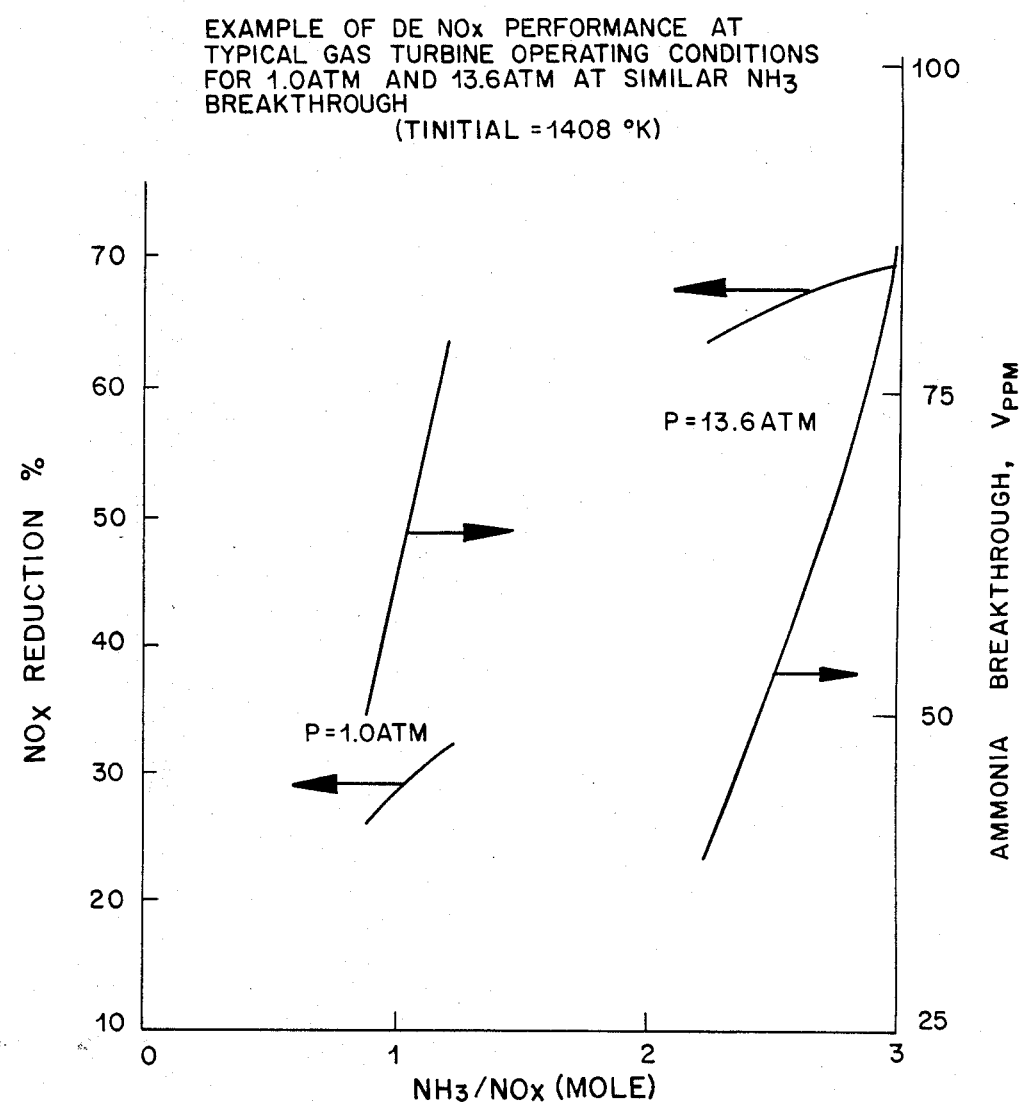
FIGS. 3 and 4 are plots at about 1408° K. and about 1450° K., respectively, indicating the percentage of NO$_x$ reduction and also the ammonia breakthrough, in vppm at both 1 atmosphere and 13.6 atmospheres, all as functions of the NH$_3$:NO$_x$ mole ratio.
Figure 4:
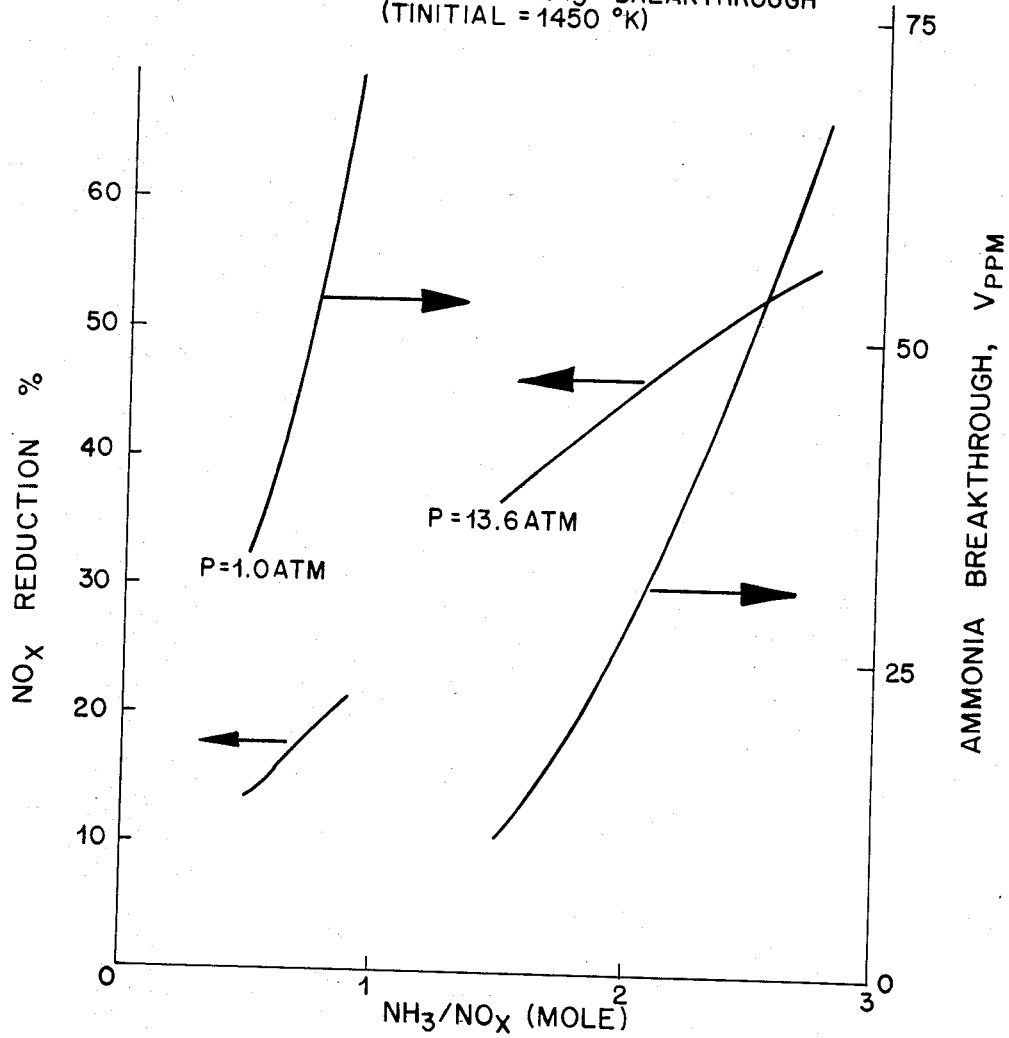

FIGS. 3 and 4 disclose a series of calculations on percentage of $NO_x$ reduction at about 1408° K. and about 1450° K. In both of these series of calculations the assumed flue gas conditions were as follows:
Initial $NO_x$ concentration 425 vppm
$O_2$ concentration 14.3 volume %
$H_2O$ concentration 6.06 volume %

Figure 5:
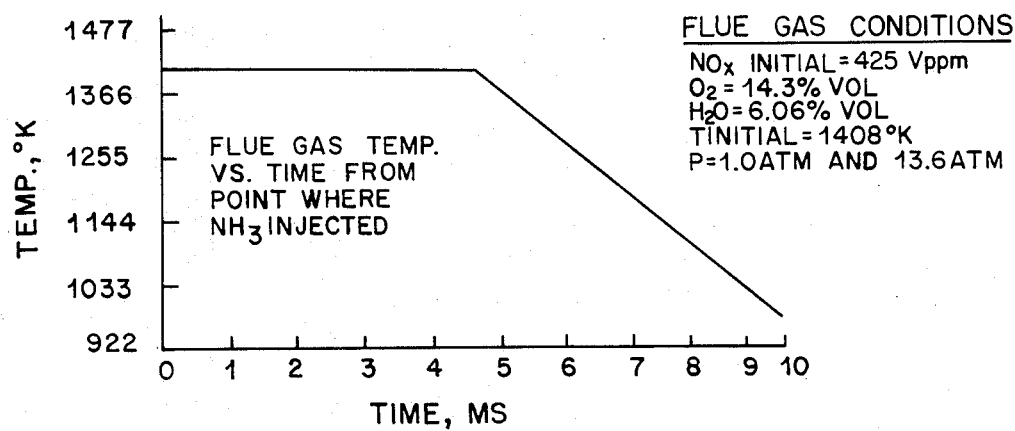
FIGS. 5 and 6 are plots of the flue gas temperature vs. time from the point where ammonia is injected at about 1408° K. and about 1450° K., respectively.

FIG. 3, utilizing calculations at an initial temperature of about 1408° K., illustrates the percentage of $NO_x$ reduction and the ammonia breakthrough, vppm, as a function of varying $NH_3:NO_x$ mole ratios for 1 atmosphere and for 13.6 atmospheres. FIG. 5 graphically represents the combustion gas effluent temperature during the entire assumed 0.007 residence time in the contacting zone after ammonia injection. The relatively uniform temperature for the initial 0.002 seconds represents residence time in the combustion zone, while the remaining 0.005 seconds represents residence time in the fan section of the turbine. FIG. 3 graphically illustrates that, at a given ammonia breakthrough, the $NO_x$ reduction at 13.6 atmospheres is considerably greater than at 1 atmosphere. For example, if it were determined that the ammonia breakthrough should be a maximum of 60 vppm, at 1 atmosphere this would indicate use of a $NH_3$:$NO_x$ mole ratio of about 1 and a $NO_x$ reduction of about 28.5%. At 13.6 atmospheres, maintaining a maximum 60 vppm breakthrough, FIG. 3 indicates that a $NH_3$:$NO_x$ ratio of about 2.63:1 should be used, which will result in about a 67.5% $NO_x$ reduction.

Figure 6:
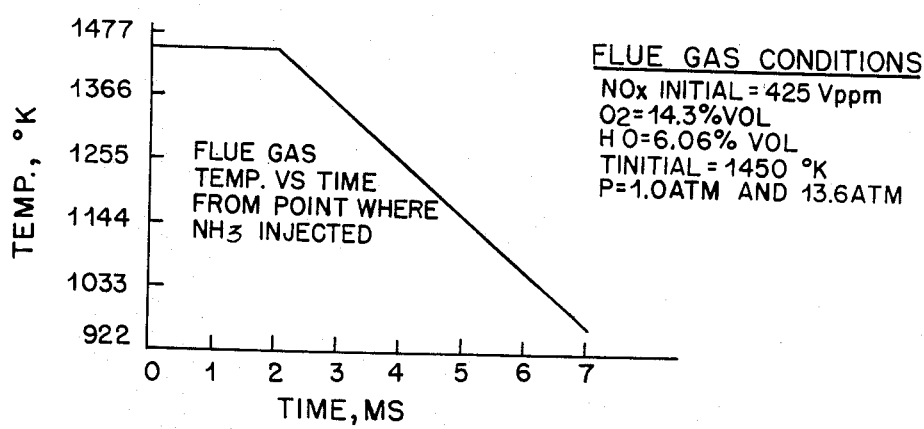

In a similar manner, FIG. 4 illustrates that if the ammonia breakthrough at 1450° K. were to be maintained at a maximum of 50 vppm at 1 atmosphere would would require a $NH_3$:$NO_x$ mole ratio of about 0.73:1. Ammonia addition at this rate would reduce the $NO_x$ by about 18%. By comparison, if the same 50 vppm ammonia breakthrough were to be utilized at 13.6 atmospheres, an $NH_3$:$NO_x$ mole ratio of about 2.48:1 could be utilized, resulting in a predicted $NO_x$ reduction of about 52.5%. FIG. 6 represents the temperature profile for the entire 0.010 residence time in the contacting zone after ammonia injection. The relatively constant temperature for the first 0.005 seconds represents residence time in the combustion zone, while the remaining 0.005 seconds represents residence time in the fan section. Thus, it can be seen from the plots of FIGS. 3 and 4 that higher pressures permit higher $NH_3$:$NO_x$ molar ratios for the same ammonia breakthroughs and result in significantly greater $NO_x$ reductions.

The pressure in a gas turbine typically will range between about 10 and about 15 atmospheres. The temperature will be a function of the specific type of turbine and the degree of loading. Typically, the maximum temperature in the turbine will range between about 1350° K. and about 1450° K. From the plots in FIGS. 3 and 4, it can be seen that the addition of $NH_3$ at these conditions can reduce $NO_x$ emissions significantly.

Since the actual $NO_x$ reduction achieved in a given situation is dependent upon the actual residence time of the $NH_3$ and $NO_x$ at the elevated temperature in the contacting zone, and since this temperature-time relationship changes with load, in any given situation it may be desirable to utilize multiple $NH_3$ injection locations utilized singularly or in combination to insure optimum $NO_x$ reduction for the expected range of operating conditions. The ammonia addition rate generally is determined by the degree of $NO_x$ removal desired and/or by the maximum permissible ammonia content in the exit gas, i.e., the ammonia breakthrough. The mol ratio of ammonia added to the contacting zone to the $NO_x$ entering the contacting zone ranges between about 0.5:1 and about 10:1, preferably between about 3:1 and about 1:1. The ammonia concentration exiting the contacting zone may range between about 0 and about 100 vppm. Since the $NH_3$ typically is added with a carrier gas to promote good mixing, and since the $NO_x$ reduction is dependent on the degree of $NO_x$—$NH_3$ interaction, it may be advantageous to vary the quantity of the carrier gas while monitoring the $NO_x$ concentration in the exit gas to determine the optimum carrier gas quantity.

In summary, from the examples presented herein it has been shown that significant NO reductions can be achieved through injecting $NH_3$ into gas turbine combustors at the proper location corresponding to an optimum flue gas temperature and elevated (10-15 atm) pressure. It also has been demonstrated that simultaneous injection of $H_2O$ to achieve $NO_x$ reduction is compatible with $NH_3$ injection. Since $H_2O$ injection occurs upstream of the $NH_3$ injection, the reduction by $NH_3$ takes place subsequent to that achieved by $H_2O$ injection, and the increased $H_2O$ content of the flue gas has minimal impact on the $NH_3$ injection effectiveness.

What is claimed is:

1. A process for reducing $NO_x$ concentration in a combustion effluent containing at least 0.1 volume percent $O_2$ comprising the step of contacting said effluent with ammonia at a temperature in the range of about 1100° K. to about 1500° K. and at a pressure in the range of above 1 to 100 atmospheres, said contacting being carried out at a residence time of above 2 to about 75 milliseconds such that a reduction of $NO_x$ in the combustion effluent is realized which is greater than that achieved by carrying out the process under substantially similar conditions but at atmospheric pressure.

2. The process of claim 1 wherein said pressure is in the range of 10 to 100 atmospheres.

3. The process of claim 1 wherein said residence time is in the range of 20-30 milliseconds.

4. The process of claim 1 wherein said combustion effluent is generated by a gas turbine.

5. A process for reducing the $NO_x$ concentration in the combustion effluent of a gas turbine wherein the combustion effluent comprises at least 0.1 volume percent $O_2$, said process comprising the step of contacting the effluent with ammonia at a temperature ranging between about 1100° K. and about 1500° K., at a pressure in the range of above 1 to 100 atmospheres, said contacting being carried out in a contacting zone having a residence time of above 2 to about 75 milliseconds to thereby reduce the $NO_x$ concentration in the combustion effluent.

6. The process of claim 5 wherein the superatmospheric pressure ranges between about 10 and about 100 atmospheres.

7. The process of claim 5 wherein the residence time in the contacting zone ranges between about 20 and 30 milliseconds.

8. The process of claim 5 wherein water or steam also is injected into the combustion effluent.

9. The process of claim 8 wherein multiple ammonia injection ports are disposed along the contacting zone and the point or points of ammonia addition varied as necessary to reduce the $NO_x$ concentration in the combustion effluent.

10. The process of claim 8 further comprising the addition of carrier gas to the contacting zone with the ammonia to promote intermixing of the ammonia with the combustion effluent.

11. The process of claim 5 wherein the ammonia concentration in the combustion effluent exiting the contacting zone ranges between about 0 and about 100 vppm.

12. The process of claim 5 wherein the mol ratio of the ammonia added to the contacting zone to the $NO_x$ entering the contacting zone ranges between about 0.5:1 and about 10:1.

13. The process of claim 12 wherein the mol ratio of the ammonia added to the contacting zone to the $NO_x$ entering the contacting zone ranges between about 3:1 and about 1:1.

14. A process for reducing the $NO_x$ concentration of gas turbine combustion effluent in a contacting zone where the combustion effluent comprises at least 0.1 volume percent $O_2$, at a temperature ranging between about 1100° K. and about 1500° K., and at superatmospheric pressure where the combustion effluent has a residence time greater than 2 milliseconds in the contacting zone, which process comprises injecting ammonia in an amount and at a location determined by the solution of the set of simultaneous equations derived from the following kinetic model:

KINETIC MODEL
Rate constant $K = AT^n \exp[-E/(1.98)T]$
M = Any Other Compound

| REACTION | A | n | E |
|---|---|---|---|
| 1. $NH_3+O=NH_2+H_2$ | .246E+14 | 0.0 | 17071. |
| 2. $NH_3+O=NH_2+OH$ | .150E+13 | 0.0 | 6040. |
| 3. $NH_3+OH=NH_2+H_2O$ | .326E+13 | 0.0 | 2120. |
| 4. $HNO+M=NO+H+M$ | .186E+17 | 0.0 | 48680. |
| 5. $HNO+OH=NO+H_2O$ | .360E+14 | 0.0 | 0. |
| 6. $NH_2+HNO=NH_3+NO$ | .175E+15 | 0.0 | 1000. |
| 7. $NH_2+NO=NNH+OH$ | .610E+20 | -2.46 | 1866. |
| 8. $NH_2+O_2=HNO+OH$ | .510E+14 | 0.0 | 30000. |
| 9. $NNH+NH_2=N_2+NH_3$ | .100E+14 | 0.0 | 0. |
| 10. $NH_2+O=NH+OH$ | .170E+14 | 0.0 | 1000. |
| 11. $NH_2+OH=NH+H_2O$ | .549E+11 | 0.68 | 1290. |
| 12. $NH_2+H=NH+H_2$ | .500E+12 | 0.5 | 2000. |
| 13. $NH+O_2=NHO+O$ | .300E+14 | 0.0 | 3400. |
| 14. $H_2+OH=H_2O+H$ | .220E+14 | 0.0 | 5150. |
| 15. $H+O_2=OH+O$ | .220E+15 | 0.0 | 16800. |
| 16. $O+H_2=OH+OH$ | .180E+11 | 1.0 | 8900. |
| 17. $H+HO_2=OH+OH$ | .180E+11 | 0.0 | 1900. |
| 18. $O+HO_2=O_2+OH$ | .250E+15 | 0.0 | 1000. |
| 19. $OH+HO_2=H_2O+O_2$ | .480E+15 | 0.0 | 1000. |
| 20. $OH+OH=O+H_2O$ | .500E+14 | 0.0 | 1090. |
| 21. $HO_2+NO=NO_2+OH$ | .630E+13 | 0.0 | -260. |
| 22. $H+NO_2=NO+OH$ | .350E+15 | 0.0 | 1500. |
| 23. $O+NO_2=NO+O_2$ | .100E+14 | 0.0 | 600. |
| 24. $H+O_2+M=HO_2+M$ $H_2O/21$** | .150E+16 | 0.0 | -995. |
| 25. $NNH+M=N_2+H+M$ | .200E+15 | 0.0 | 30000. |
| 26. $NO_2+M=NO+O+M$ | .110E+17 | 0.0 | 66000. |
| 27. $NH_3+M=NH+H+M$ | .480E+17 | 0.0 | 93929. |
| 28. $O+O+M=O_2+M$ | .138E+19 | -1.0 | 340. |
| 29. $NH_3+NO=N_2+H_2O$ | .910E+20 | -2.46 | 1866. |
| 30. $NNH+OH=N_2+H_2O$ | .300E+14 | 0.0 | 0. |
| 31. $NNH+NO=N_2+HNO$ | .906E+12 | 0.0 | 0. |

**i.e., $A = 21 \times .15E+16$ for $H_2O$ as "third body". The "third body" may be any other constituent present.

15. The process of claim 14 wherein the mol ratio of ammonia added to the contacting zone to the $NO_x$ entering the contacting zone ranges between 0.5:1 and about 10:1.

16. The process of claim 15 wherein the ammonia concentration in the combustion effluent ranges between about 0 and about 100 vppm.

* * * * *